US011772656B2

(12) United States Patent
Mallik et al.

(10) Patent No.: US 11,772,656 B2
(45) Date of Patent: Oct. 3, 2023

(54) ENHANCED VEHICLE OPERATION

(71) Applicant: Ford Global Technologies, LLC, Dearborn, MI (US)

(72) Inventors: Apurbaa Mallik, Sunnyvale, CA (US); Kaushik Balakrishnan, Mountain View, CA (US); Vijay Nagasamy, Fremont, CA (US); Praveen Narayanan, San Jose, CA (US); Sowndarya Sundar, Mountain View, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 457 days.

(21) Appl. No.: 16/923,367

(22) Filed: Jul. 8, 2020

(65) Prior Publication Data

US 2022/0009498 A1    Jan. 13, 2022

(51) Int. Cl.
*B60W 40/00* (2006.01)
*B60W 40/02* (2006.01)
*B60W 60/00* (2020.01)
*G06N 20/00* (2019.01)
*G06V 10/75* (2022.01)

(52) U.S. Cl.
CPC .......... *B60W 40/02* (2013.01); *B60W 60/005* (2020.02); *G06N 20/00* (2019.01); *G06V 10/751* (2022.01); *B60W 2420/42* (2013.01); *B60W 2555/20* (2020.02)

(58) Field of Classification Search
CPC ............... B60W 40/02; B60W 60/005; B60W 2420/42; B60W 2555/20; B60W 60/0053; G06N 3/084; G06N 20/00; G06V 10/751; G06V 10/774; G06V 20/58; B60R 16/0237; B60R 2300/304
See application file for complete search history.

(56) References Cited

U.S. PATENT DOCUMENTS

| 9,727,792 | B2 | 8/2017 | Martini et al. | |
| 2020/0339128 | A1* | 10/2020 | Kanoh | B62D 6/00 |
| 2021/0142526 | A1* | 5/2021 | Mantyjarvi | B60W 50/0097 |
| 2021/0158098 | A1* | 5/2021 | Shimizu | G06V 20/70 |
| 2021/0309248 | A1* | 10/2021 | Choe | B60W 50/06 |

FOREIGN PATENT DOCUMENTS

| DE | 102015003960 A1 | 8/2015 |
| DE | 102017208994 A1 | 11/2018 |
| KR | 102005559 B1 | 8/2019 |

OTHER PUBLICATIONS

Sakaridis, C., Dai, D., Van Gool, L., "Semantic Foggy Scene Understanding with Synthetic Data", International Journal of Computer Vision (Mar. 23, 2018) 126: 973-992 (Year: 2018).*

* cited by examiner

*Primary Examiner* — Ian Jen
(74) *Attorney, Agent, or Firm* — Frank A. MacKenzie; Bejin Bieneman PLC

(57) ABSTRACT

A system includes a computer including a processor and a memory, the memory storing instructions executable by the processor to generate a synthetic image by adjusting respective color values of one or more pixels of a reference image based on a specified meteorological optical range from a vehicle sensor to simulated fog, and input the synthetic image to a machine learning program to train the machine learning program to identify a meteorological optical range from the vehicle sensor to actual fog.

16 Claims, 5 Drawing Sheets

ENHANCED VEHICLE OPERATION

BACKGROUND

Vehicles can be equipped with computing devices, networks, sensors and controllers to acquire data regarding the vehicle's environment and to operate the vehicle based on the data. Vehicle sensors can provide data concerning routes to be traveled and objects to be avoided in the vehicle's environment. Operation of the vehicle can rely upon acquiring accurate and timely data regarding objects in a vehicle's environment while the vehicle is being operated on a roadway. Vehicles may use computing devices configured to identify objects from image data collected by the vehicle sensors.

DETAILED DESCRIPTION

Figure 1:
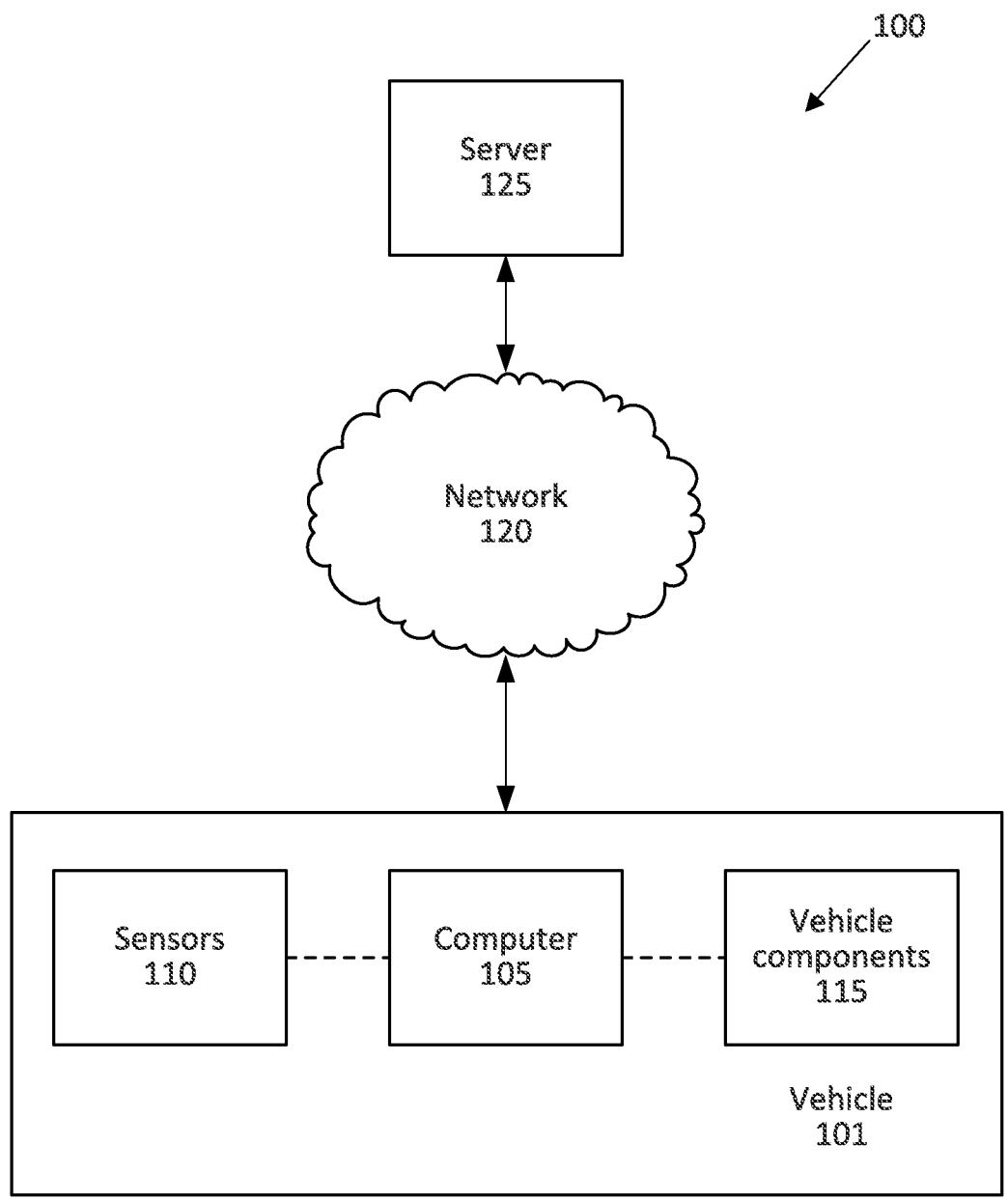
FIG. 1 is a diagram of an example system for operating a vehicle.

A system includes a computer including a processor and a memory, the memory storing instructions executable by the processor to generate a synthetic image by adjusting respective color values of one or more pixels of a reference image based on a specified meteorological optical range from a vehicle sensor to simulated fog and input the synthetic image to a machine learning program to train the machine learning program to identify a meteorological optical range from the vehicle sensor to actual fog.

The instructions can further include instructions to collect an image with the vehicle sensor, input the image to the machine learning program, output, from the machine learning program, the meteorological optical range from the vehicle sensor to the actual fog, and actuate one or more vehicle components based on the meteorological optical range from the vehicle sensor to the actual fog.

The instructions can further include instructions to transition one of the one or more vehicle components from autonomous operation to manual operation when the meteorological optical range from the vehicle sensor to the actual fog is below a distance threshold.

The instructions can further include instructions to transition a vehicle from an autonomous mode to a manual mode when the meteorological optical range from the vehicle sensor to the actual fog is below a second distance threshold.

The instructions can further include instructions to actuate a first component when the meteorological optical range from the vehicle sensor to the actual fog is above a first threshold and to actuate a second component when the meteorological optical range from the vehicle sensor to the actual fog is above a second threshold.

The instructions can further include instructions to output, from the machine learning program, an object in the collected image and to actuate the one or more vehicle components based on the object output by the machine learning program.

The instructions can further include instructions to identify an ambient light of the reference image and to adjust the respective color values of the one or more pixels based on the ambient light.

The instructions can further include instructions to annotate the synthetic image with the meteorological optical range from the sensor to the simulated fog.

The instructions can further include instructions to adjust the color values of one of the pixels in the reference image by decreasing the color values of the one of the pixels based on a transmission coefficient of light through fog and increasing an ambient light of the pixel based on the transmission coefficient.

The instructions can further include instructions to identify an initial distance from the vehicle sensor to an object in one of the pixels of the reference image and to adjust the color values of the one of the pixels based on the initial distance and the specified meteorological optical range from the vehicle sensor to the simulated fog.

The instructions can further include instructions to identify respective meteorological optical ranges from the vehicle sensor to the actual fog for all pixels in an image collected by the vehicle sensor and to actuate one or more vehicle components based on a minimum meteorological optical range from the vehicle sensor to the actual fog.

The instructions can further include instructions to identify an object with a second vehicle sensor and a distance from the second vehicle sensor to the object, and to suppress actuation of one or more vehicle components based on the identified object when the distance from the second vehicle sensor to the object exceeds the meteorological optical range from the vehicle sensor to the actual fog.

The meteorological optical range is a distance at which a luminosity of a beam of light extending from the vehicle sensor falls below a luminosity threshold.

A method includes generating a synthetic image by adjusting respective color values of one or more pixels of a reference image based on a specified meteorological optical range from a vehicle sensor to simulated fog, the meteorological optical range being a distance at which a luminosity of a beam of light extending from the vehicle sensor falls below a luminosity threshold and inputting the synthetic image to a machine learning program to train the machine learning program to identify a meteorological optical range from the vehicle sensor to actual fog The method can further include collecting an image with the vehicle sensor, inputting the image to the machine learning program, outputting, from the machine learning program, the meteorological optical range from the vehicle sensor to the actual fog, and actuating one or more vehicle components based on the meteorological optical range from the vehicle sensor to the actual fog.

The method can further include transitioning one of the one or more vehicle components from autonomous operation to manual operation when the meteorological optical range from the vehicle sensor to the actual fog is below a distance threshold.

The method can further include transitioning a vehicle from an autonomous mode to a manual mode when the meteorological optical range from the vehicle sensor to the actual fog is below a second distance threshold.

The method can further include actuating a first component when the meteorological optical range from the vehicle sensor to the actual fog is above a first threshold and actuating a second component when the meteorological optical range from the vehicle sensor to the actual fog is above a second threshold.

The method can further include outputting, from the machine learning program, an object in the collected image and actuating the one or more vehicle components based on the object output by the machine learning program.

The method can further include identifying an ambient light of the reference image and adjusting the respective color values of the one or more pixels based on the ambient light.

The method can further include annotating the synthetic image with the meteorological optical range from the sensor to the simulated fog.

The method can further include adjusting the color values of one of the pixels in the reference image by decreasing the color values of the one of the pixels based on a transmission coefficient of light through fog and increasing an ambient light of the pixel based on the transmission coefficient.

The method can further include identifying an initial distance from the vehicle sensor to an object in one of the pixels of the reference image and adjusting the color values of the one of the pixels based on the initial distance and the specified meteorological optical range from the vehicle sensor to the simulated fog.

The method can further include identifying respective meteorological optical ranges from the vehicle sensor to the actual fog for all pixels in an image collected by the vehicle sensor and actuating one or more vehicle components based on a minimum meteorological optical range from the vehicle sensor to the actual fog.

The method can further include identifying an object with a second vehicle sensor and a distance from the second vehicle sensor to the object, and suppressing actuation of one or more vehicle components based on the identified object when the distance from the second vehicle sensor to the object exceeds the meteorological optical range from the vehicle sensor to the actual fog.

A system includes a vehicle sensor, means for generating a synthetic image by adjusting respective color values of one or more pixels of a reference image based on a specified meteorological optical range from the vehicle sensor to simulated fog, the meteorological optical range being a distance at which a luminosity of a beam of light extending from the vehicle sensor falls below a luminosity threshold, means for inputting the synthetic image to a machine learning program to train the machine learning program to identify a meteorological optical range from the vehicle sensor to actual fog, means for collecting an image with the vehicle sensor, means for inputting the image to the machine learning program, means for outputting, from the machine learning program, the meteorological optical range from the vehicle sensor to the actual fog, and means for actuating one or more vehicle components based on the meteorological optical range from the vehicle sensor to the actual fog.

The system can further include means for transitioning one of the one or more vehicle components from autonomous operation to manual operation when the meteorological optical range from the vehicle sensor to the actual fog is below a distance threshold.

The system can further include means for outputting, from the machine learning program, an object in the collected image and means for actuating the one or more vehicle components based on the object output by the machine learning program.

Further disclosed is a computing device programmed to execute any of the above method steps. Yet further disclosed is a vehicle comprising the computing device. Yet further disclosed is a computer program product, comprising a computer readable medium storing instructions executable by a computer processor, to execute any of the above method steps.

Fog can occlude images collected by vehicle sensors. That is, fog between an object and a vehicle sensor can obscure the object in the image collected by the vehicle sensor. Identifying a distance to the object from the vehicle sensor can be difficult in an image obscured by fog. A vehicle computer can operate a vehicle based on data from the vehicle sensor. When the data is occluded by fog, the vehicle computer can ignore data collected beyond a "meteorological optical range," i.e., a distance at which light attenuates to below a predetermined threshold, as described below. That is, the electromagnetic waves received by the sensor from beyond the meteorological optical range may be attenuated or reduced by the fog, and these attenuated waves may not accurately or precisely provide data about the object. Using a machine learning program can identify the meteorological optical range of fog in an image collected by the vehicle sensor more quickly than, e.g., a three-dimensional depth detection algorithm. The quicker identification of the meteorological optical range can improve operation of the vehicle computer by updating the distance beyond which the vehicle computer should ignore data as the vehicle travels along a route.

FIG. 1 illustrates an example system 100 for operating a vehicle 101. A computer 105 in the vehicle 101 is programmed to receive collected data from one or more sensors 110. For example, vehicle 101 data may include a location of the vehicle 101, data about an environment around a vehicle, data about an object outside the vehicle such as another vehicle, etc. A vehicle 101 location is typically provided in a conventional form, e.g., geo-coordinates such as latitude and longitude coordinates obtained via a navigation system that uses the Global Positioning System (GPS). Further examples of data can include measurements of vehicle 101 systems and components, e.g., a vehicle 101 velocity, a vehicle 101 trajectory, etc.

The computer 105 is generally programmed for communications on a vehicle 101 network, e.g., including a conventional vehicle 101 communications bus such as a CAN bus, LIN bus, etc., and or other wired and/or wireless technologies, e.g., Ethernet, WIFI, etc. Via the network, bus, and/or other wired or wireless mechanisms (e.g., a wired or wireless local area network in the vehicle 101), the computer 105 may transmit messages to various devices in a vehicle 101 and/or receive messages from the various devices, e.g., controllers, actuators, sensors, etc., including sensors 110. Alternatively or additionally, in cases where the computer 105 actually comprises multiple devices, the vehicle network may be used for communications between devices represented as the computer 105 in this disclosure. In addition, the computer 105 may be programmed for communicating with the network 120, which, as described below, may include various wired and/or wireless networking technologies, e.g., cellular, Bluetooth®, Bluetooth® Low Energy (BLE), wired and/or wireless packet networks, etc.

The memory can be of any type, e.g., hard disk drives, solid state drives, servers, or any volatile or non-volatile media. The memory can store the collected data sent from the sensors 110. The memory can be a separate device from the computer 105, and the computer 105 can retrieve information stored by the memory via a network in the vehicle 101, e.g., over a CAN bus, a wireless network, etc. Alternatively or additionally, the memory can be part of the computer 105, e.g., as a memory of the computer 105.

Sensors 110 can include a variety of devices. For example, various controllers in a vehicle 101 may operate as sensors 110 to provide data via the vehicle 101 network or bus, e.g., data relating to vehicle speed, acceleration, position, subsystem and/or component status, etc. Further, other sensors 110 could include cameras, motion detectors, etc., i.e., sensors 110 to provide data for evaluating a position of a component, evaluating a slope of a roadway, etc. The sensors 110 could, without limitation, also include short range radar, long range radar, LIDAR, and/or ultrasonic transducers.

Collected data can include a variety of data collected in a vehicle 101. Examples of collected data are provided above, and moreover, data are generally collected using one or more sensors 110, and may additionally include data calculated therefrom in the computer 105, and/or at the server 125. In general, collected data may include any data that may be gathered by the sensors 110 and/or computed from such data.

The vehicle 101 can include a plurality of vehicle components 115. In this context, each vehicle component 115 includes one or more hardware components adapted to perform a mechanical function or operation—such as moving the vehicle 101, slowing or stopping the vehicle 101, steering the vehicle 101, etc. Non-limiting examples of components 115 include a propulsion component (that includes, e.g., an internal combustion engine and/or an electric motor, etc.), a transmission component, a steering component (e.g., that may include one or more of a steering wheel, a steering rack, etc.), a brake component, a park assist component, an adaptive cruise control component, an adaptive steering component, a movable seat, and the like.

For purposes of this disclosure, the vehicle 101 can operate in one of a fully autonomous mode, a semi-autonomous mode, or a non-autonomous mode. A fully autonomous mode is defined as one in which each of vehicle 101 propulsion (typically via a powertrain including an electric motor and/or internal combustion engine), braking, and steering are controlled by the computer 105. A semi-autonomous mode is one in which at least one of vehicle 101 propulsion (typically via a powertrain including an electric motor and/or internal combustion engine), braking, and steering are controlled at least partly by the computer 105 as opposed to a human operator. In a non-autonomous mode, i.e., a manual mode, the vehicle 101 propulsion, braking, and steering are controlled by the human operator.

The system 100 can further include a network 120 connected to a server 125. The computer 105 can further be programmed to communicate with one or more remote sites such as the server 125, via the network 120, such remote site possibly including a processor and a memory. The network 120 represents one or more mechanisms by which a vehicle computer 105 may communicate with a remote server 125. Accordingly, the network 120 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth®, Bluetooth® Low Energy (BLE), IEEE 802.11, vehicle-to-vehicle (V2V) such as Dedicated Short Range Communications (DSRC), etc.), local area networks (LAN) and/or wide area networks (WAN), including the Internet, providing data communication services.

Figure 2A:
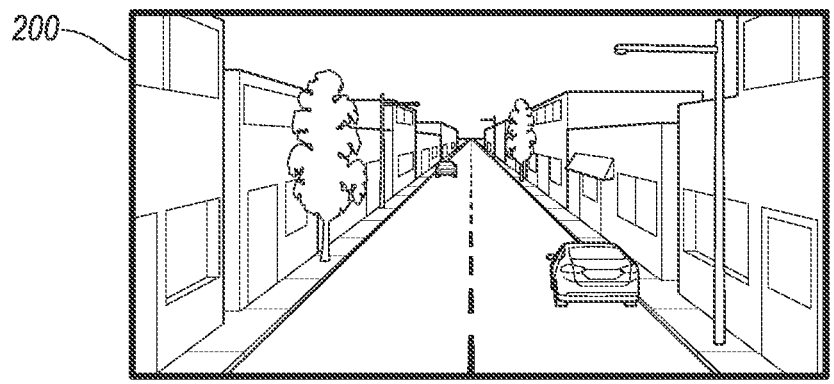
FIGS. 2A-2C are example images with simulated fog.
Figure 2B:
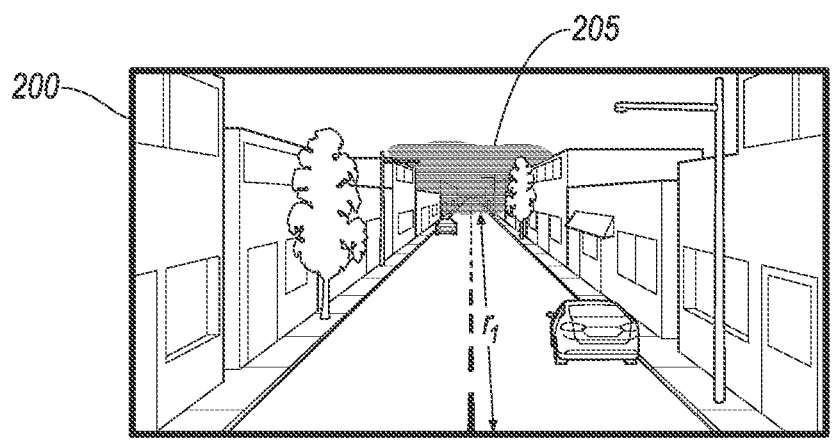
Figure 2C:
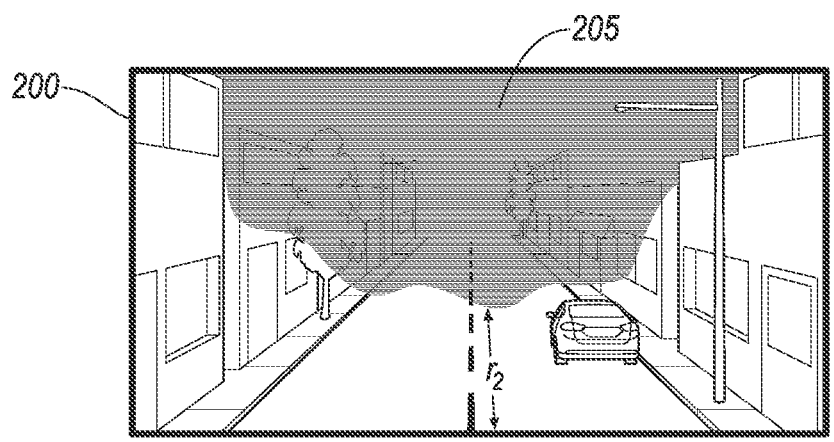

FIGS. 2A-2C illustrate images 200 with simulated fog 205. In the context of this document, "fog" is a visible aerosol containing water droplets or ice crystals suspended in air above a roadway that can reduce or block light transmission therethrough. Further in the context of this document, "simulated fog" is a specification of color values of the image 200, typically changing original color values, to mimic the occlusion caused by actual fog. That is, the image 200 can be matrix, each element of the matrix being a set of red-blue-green (RGB) color values or a black-and-white (BW) color value. Each element of the matrix is a "pixel" of the image 200. Each pixel can have a set of color values, i.e., numbers representing respective color components such as red-blue-green, that specify a color for the pixel. The simulated fog 205 can be a set of pixels in which color values are adjusted to be closer to a white color than the original RGB or BW values. That is, in RGB, a pixel is white when its RGB values are 256-256-256. A pixel of the simulated fog 205 can have RBG color values that are between an original set of RGB values of the pixel and the white color 256-256-256. FIG. 2A illustrates a reference image 200 with no simulated fog 205. FIG. 2B illustrates the reference image 200 with simulated fog 205 at a distance $r_1$ from the sensor 110, as described below. FIG. 2C illustrates the reference image 200 with simulated fog 205 at a distance $r_2$ from the sensor 110, as described below. The "reference" image 200 can be an image 200 used to train a machine learning program, as described below.

The server 125 can apply the simulated fog 205 to the reference image 200 by applying a color changing model to the image 200:

$$F(x)=t(x)R(x)+L(1-t(x)) \qquad (1)$$

where x is a pixel of the image 200, F(x) is a matrix representing the image 200 with simulated fog 205, R(x) is a matrix representing the original image 200, t(x) is a transmission coefficient, as described below, and L is an ambient light, as described below.

The transmission coefficient t(x) is a number between 0 and 1 that represents an amount of light that reaches the camera 110:

$$t(x)=\exp(-\beta \cdot s(x)) \qquad (2)$$

where β is an attenuation coefficient and s(x) is an initial distance from the camera 110 to an object in the reference image 200 without fog. The attenuation coefficient β is a value quantifying the exponential decay of transmission of light to the initial distance s(x) to the object. Specifically, the attenuation coefficient β is based on a meteorological optical range (MOR) r. The meteorological optical range r is a distance at which a luminosity of a beam of light extending from an emitter (e.g., a light source at the sensor 110) falls below a luminosity threshold. The luminosity threshold is a predetermined value set by a standard setting organization, e.g., the International Civil Aviation Organization. For example, the luminosity threshold can be 5%. Thus, the server 125 can simulate fog 205 at specified MOR values to train the machine learning program. The attenuation coefficient β can thus be defined according to the luminosity threshold, for example: β=2.996/r when the luminosity threshold is 5%.

The color changing model can use ambient light L(1−t(x)) to apply the simulated fog 205. In this context, "ambient light" is a constant RBG value representing atmospheric light, e.g., a white color with an RBG value of 256-256-256. The ambient light L is thus applied to the reference image 200 to occlude objects in the reference image 200. That is, the ambient light L changes the color values of pixels x proportional to 1−t(x), generating the simulated fog 205. That is, as the transmission coefficient t(x) increases, the amount of ambient light L added to the pixel x reduces, reducing the amount of simulated fog 205 in the pixel x.

The server 125 can apply the simulated fog 205 at specified MOR r values. That is, the server 125 can, for each pixel x in the image 200, adjust the color values of the pixel x according to Equations 1-2 above. For example, the server 125 can apply the simulated fog 205 at an MOR r value of $r_1$ to generate the simulated fog 205 of FIG. 2B. In another example, the server 125 can apply the simulated fog 205 at an MOR r value of $r_2$ to generate the simulated fog 205 of FIG. 2C. Alternatively or additionally, the server 125 can apply the simulated fog 205 at a different MOR r value to generate simulated fog 205 at the MOR r.

The server 125 can generate a synthetic image by adjusting respective color values of one or more pixels of a reference image 200 based on a specified MOR r from the sensor 110 to the simulated fog 205. A "synthetic image" is an image in which one or more pixels are adjusted by a computer program. For example, the synthetic image can be an image 200 collected by a camera 110 in which simulated fog 205 is added. That is, the color changing model can output a synthetic image F(x), as described above. The server 125 can generate a plurality of synthetic images, each synthetic image including simulated fog 205 at a specified MOR r.

The server 125 can input a plurality of synthetic images to a machine learning program. The server 125 can train the machine learning program to identify a MOR r from the vehicle sensor 101 to actual fog with the input synthetic images. As described below, the server 125 can annotate the synthetic images with the MOR r used to input the simulated fog 205. The server 125 can determined a difference between an output MOR r of the machine learning program and the annotation of the MOR r in the synthetic image. The server 125 can input the difference to a cost function (e.g., a least-squares equation). The server 125 can, using techniques such as back-propagation and gradient descent, adjust output of the machine learning program until the cost function is minimized.

The machine learning program can output an object in the collected image 200. That is, the machine learning program can be trained to identify one or more objects in the image 200. The machine learning program can be trained with images 200 with annotations of objects in the image 200. That is, using a cost function as described above between output identification of objects and the annotations in the images 200, the server 125 can adjust output of the machine learning program to minimize the cost function. The computer 105 can actuate one or more vehicle components 115 based on the object output by the machine learning program.

The computer 105 can determine a meteorological optical range r of actual fog in an image 200. The computer 105 can collect an image 200 with a sensor 110, e.g., a camera. The computer 105 can input the image to the machine learning program, as described above. The machine learning program can output the MOR r from the sensor 110 to the actual fog for each pixel of the image 200. The computer 105 can identify a minimum MOR r that is a smallest MOR r value of the MOR r values of the pixels in the image 200.

The computer 105 can actuate one or more vehicle components 115 based on the minimum MOR r from the sensor 110 to the actual fog. The MOR r is a distance beyond which the computer 105 can ignore data from one or more sensors 110 as unreliable compared to data collected from sensors 110 without fog, i.e., where data from the sensors 110 in the absence of fog could be reliable. That is, the data collected by the sensors 110 can include a distance at which the data were collected, e.g., a distance to an identified object. If the distance at which the data were collected exceeds the identified MOR r, the computer 105 can ignore the data, suppressing use of the data to actuate components 115. For example, if the computer 105 receives data indicating that a roadway beyond the MOR r is free of objects, the computer 105 can ignore the data and collect additional data of the roadway when the vehicle 101 moves within the MOR r of the roadway. Thus, the computer 105 can actuate components 115 only with data collected within the MOR r.

Each component 115 can have a minimum distance from the vehicle 101 at which the sensors 110 collect data for autonomous operation. That is, each component 115 can use data from the sensors 110, and each component 115 can have a minimum distance from the vehicle 101 from which data is collected to operate without manual input. For example, a brake can have a minimum distance of 60 meters because, upon actuating the brake, a distance to slow a vehicle 101 from a speed of 100 kilometers per hour to a stop is about 55 meters. Thus, the computer 105 can determine that, when the MOR r is less than 60 meters, the brake should be controlled by manual input. In another example, a steering can have a minimum distance of 30 meters.

The computer 105 can transition one or more vehicle components 115 from full or semi autonomous operation to manual operation when the MOR r is below a distance threshold. The distance threshold can be the minimum distance for autonomous operation, as described above. That is, one or more components 115 may require manual input when the MOR r is below the distance threshold, and the computer 105 can transition the one or more components 115 to accept the manual input. As the MOR r to the actual fog increases beyond the respective minimum distances of the components 115, the computer 105 can actuate the components 115.

Additionally or alternatively, the computer 105 can transition the vehicle 101 from an autonomous mode to one of a semiautonomous mode or a manual mode, as described above, based on the MOR r. That is, rather than transitioning vehicle components 115 to manual operation one a time based on the MOR r, the computer 105 can transition the vehicle 101 to the semiautonomous mode or the manual mode, thereby transitioning one or more vehicle components 115 to manual operation that could still operate autonomously at the identified MOR r. When the MOR r from the sensor 110 to the actual fog is below a second distance threshold, the computer 105 can transition the vehicle from the autonomous mode to the manual mode. The second distance threshold can be a largest minimum distance, as described above, at which one of the components 115 can operate autonomously with data from the sensors 110. Because the minimum distance of the brake is greater than the minimum distance of the steering, the computer 105 can define the second threshold as the minimum distance of the brake and can determine to transition the vehicle 101 to the manual mode when the MOR r is less than the second threshold.

Figure 3:
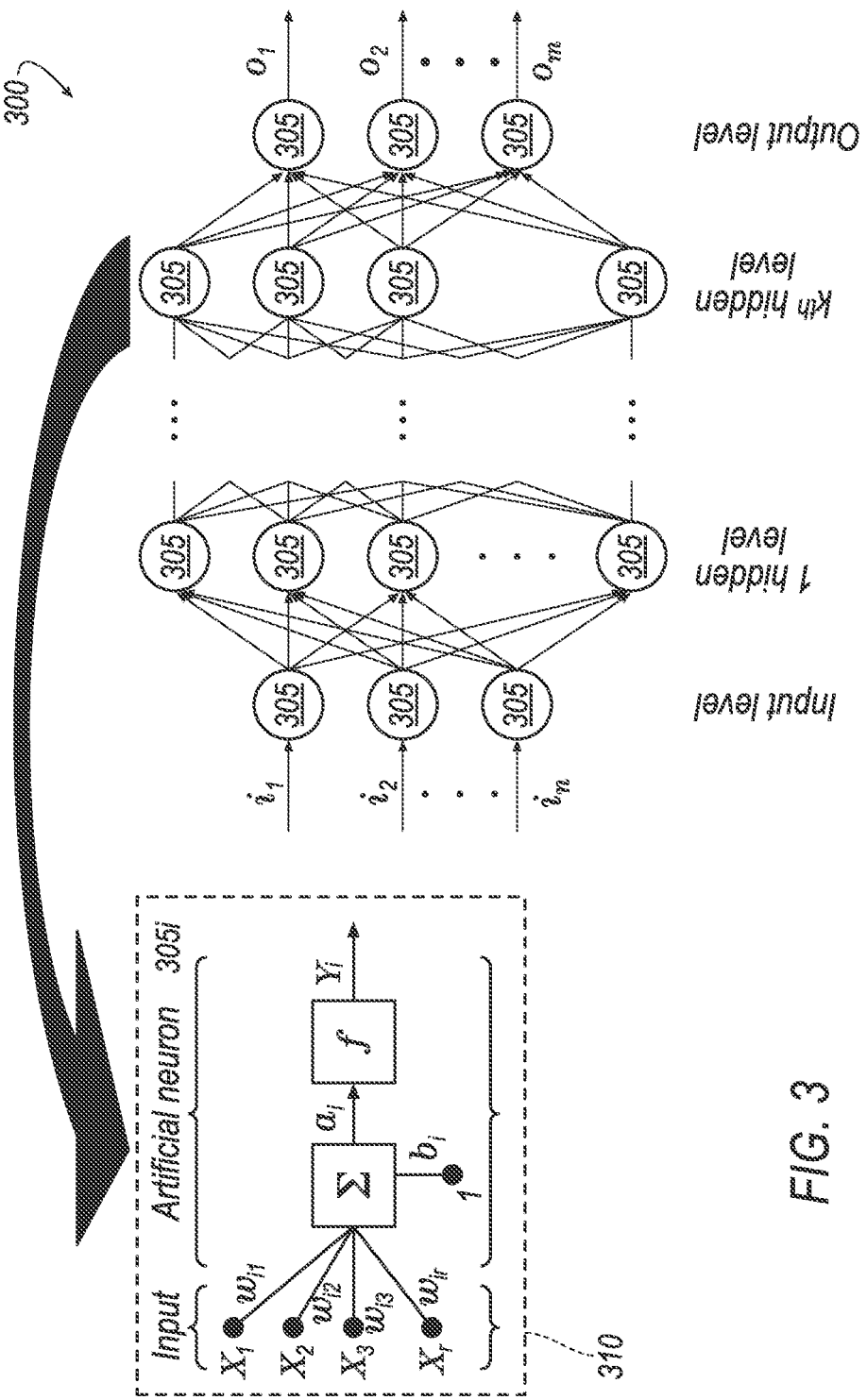
FIG. 3 is a diagram of an example machine learning program.

FIG. 3 is a diagram of an example machine learning program 300. The machine learning program 300 can be a deep neural network (DNN) 300 that could be trained to identify a meteorological optical range r of actual fog in an image 200. The DNN 300 can be a software program that can be loaded in memory and executed by a processor included in the infrastructure server 135, for example. The DNN 300 can include n input nodes 305, each accepting a set of inputs i (i.e., each set of inputs i can include one or more inputs X). The DNN 300 can include m output nodes (where m and n may be, but typically are not, a same natural number) provide sets of outputs $o_1 \ldots o_m$. The DNN 300 includes a plurality of layers, including a number k of hidden layers, each layer including one or more nodes 305. The nodes 305 are sometimes referred to as artificial neurons 305, because they are designed to emulate biological, e.g., human, neurons. The neuron block 310 illustrates inputs to and processing in an example artificial neuron 305$i$. A set of inputs $X_1 \ldots X_r$ to each neuron 305 are each multiplied by respective weights $w_{i1} \ldots w_{ir}$, the weighted inputs then being summed in input function $\Sigma$ to provide, possibly adjusted by a bias $b_i$, net input $a_i$, which is then provided to activation function $f$, which in turn provides neuron 305$i$ output $Y_i$. The activation function $f$ can be a variety of suitable functions, typically selected based on empirical analysis. As illustrated by the arrows in FIG. 3, neuron 305 outputs can then be provided for inclusion in a set of inputs to one or more neurons 305 in a next layer.

The DNN 300 can be trained to accept as input data, e.g., reference images from a camera, and to output one or more parameters for identifying the meteorological optical range r. For example, the DNN 300 could be trained to output a distance to actual fog.

That is, the DNN 300 can be trained with ground truth data, i.e., data about a real-world condition or state. Weights w can be initialized by using a Gaussian distribution, for example, and a bias b for each node 305 can be set to zero. Training the DNN 300 can including updating weights and biases via conventional techniques such as back-propagation with optimizations.

A set of weights w for a node 305 together are a weight vector for the node 305. Weight vectors for respective nodes 305 in a same layer of the DNN 300 can be combined to form a weight matrix for the layer. Bias values b for respective nodes 305 in a same layer of the DNN 300 can be combined to form a bias vector for the layer. The weight matrix for each layer and bias vector for each layer can then be used in the trained DNN 300.

In the present context, the ground truth data used to train the DNN 300 could include image data annotated to identify the MOR r. For example, a sensor can collect a plurality of images that can include simulated fog, as described above, and then can be labeled for training the DNN 300, i.e., tags can be specified identifying the MOR r, such as just described, in the images. The DNN 300 can then be trained to output data values that correlate to the MOR r, and the output data values can be compared to the annotations to identify a difference, i.e., a cost function of the output data values and the input annotated images. The weights w and biases b can be adjusted to reduce the output of the cost function, i.e., to minimize the difference between the output data values and the input annotated images. When the cost function is minimized, the server 125 can determine that the DNN 300 is trained.

Figure 4:
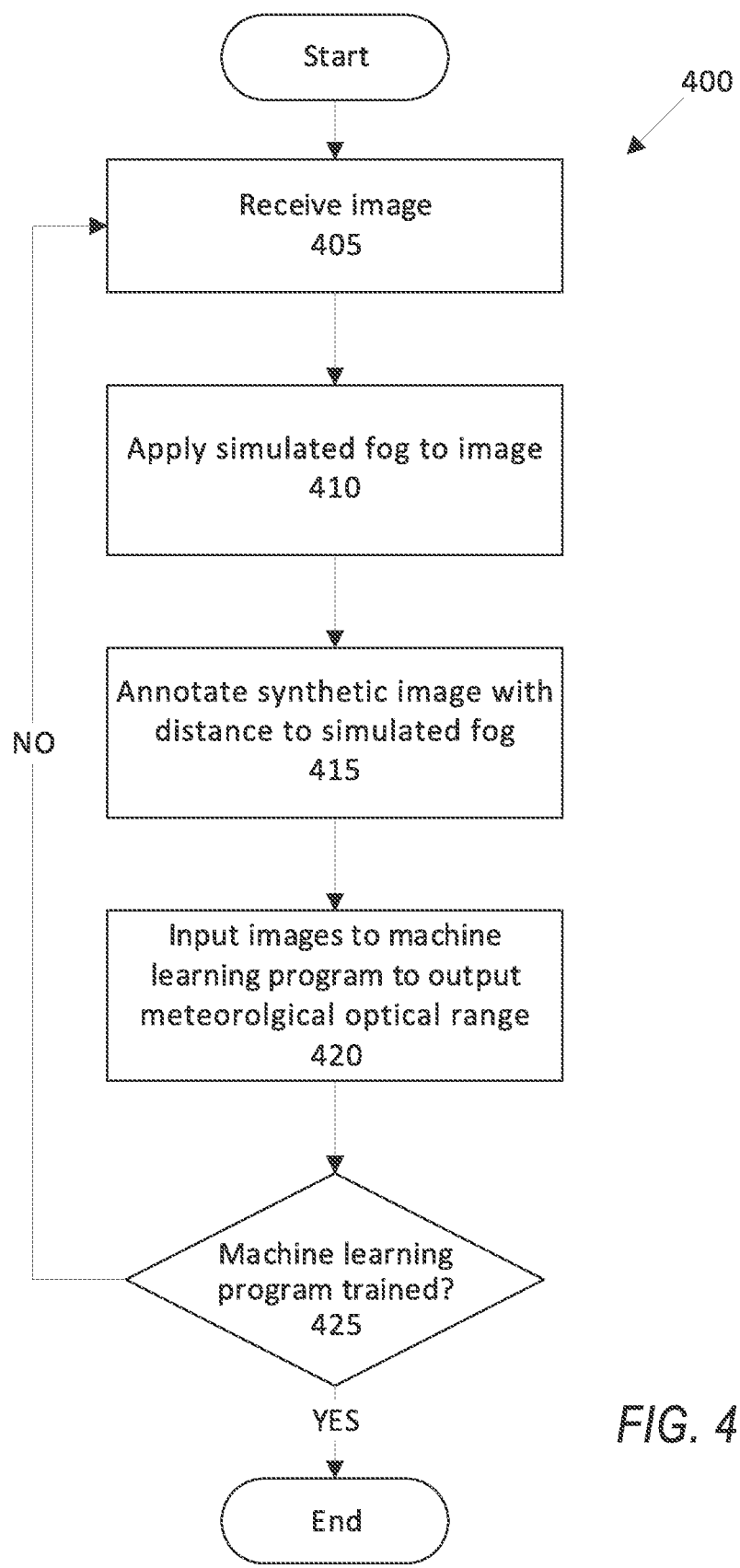
FIG. 4 is a diagram of an example process for training a machine learning program.

FIG. 4 is a diagram of an example process 400 for training a machine learning program for a vehicle 101. The process 400 begins in a block 405, in which a server 125 receives an image 200 of a roadway. The image 200 can be collected by, e.g., a camera 110 on a vehicle 101 on the roadway. The image 200 can be a red-blue-green (RBG) color image. Alternatively, the image 200 can be a black-and-white (BW) image.

Next, in a block 410, the server 125 applies simulated fog 205 to the image 200. The simulated fog 205 is a change in color values of the image 200 to mimic the occlusion caused by actual fog. The server 215 can apply the simulated fog 205 with a color changing model, as described above, that changes color values of pixels of the image 200. The color changing model can change the color values of the pixels based on a specified meteorological optical range (MOR) r, i.e., a distance from a distance at which a luminosity of a beam of light extending from an emitter (e.g., a light source at the sensor 110) falls below a luminosity threshold. The luminosity threshold is a predetermined value set by a standard setting organization, e.g., the International Civil Aviation Organization. For example, the luminosity threshold can be 5%.

Next, in a block 415, the server 125 can annotate the image 200 with the MOR r of the simulated fog 205. That is, for each pixel in which the server 125 includes simulated fog 205, the server 125 can provide a label indicating the MOR r used to input the simulated fog 205 to the pixel.

Next, in a block 420, the server 125 inputs the images 200 with the simulated fog 205 to a machine learning program 300 to output an MOR r. For example, the machine learning program can be a deep neural network 300 trained to output the MOR r based on annotations of simulated fog 205 in an image 200. When the machine learning program 300 is trained, the machine learning program 300 can output the MOR r of actual fog in an image 200 collected by a vehicle camera 110. The server 125 can adjust weights of nodes 305 of the DNN 300 to reduce output of a cost function, i.e., the minimized the difference between output data values and the input annotated images 200.

Next, in a block 425, the server 125 determines whether the machine learning program is trained. The server 125 can determine that the machine learning program is trained when the cost function is minimized. That is, the server 125 can determine that the cost function is minimized when inputting additional images 200 does not reduce output of the cost function further. If the server 125 determines that the machine learning program is trained, the process 400 ends. Otherwise, the process 400 returns to the block 405 to receive another image 200.

Figure 5:
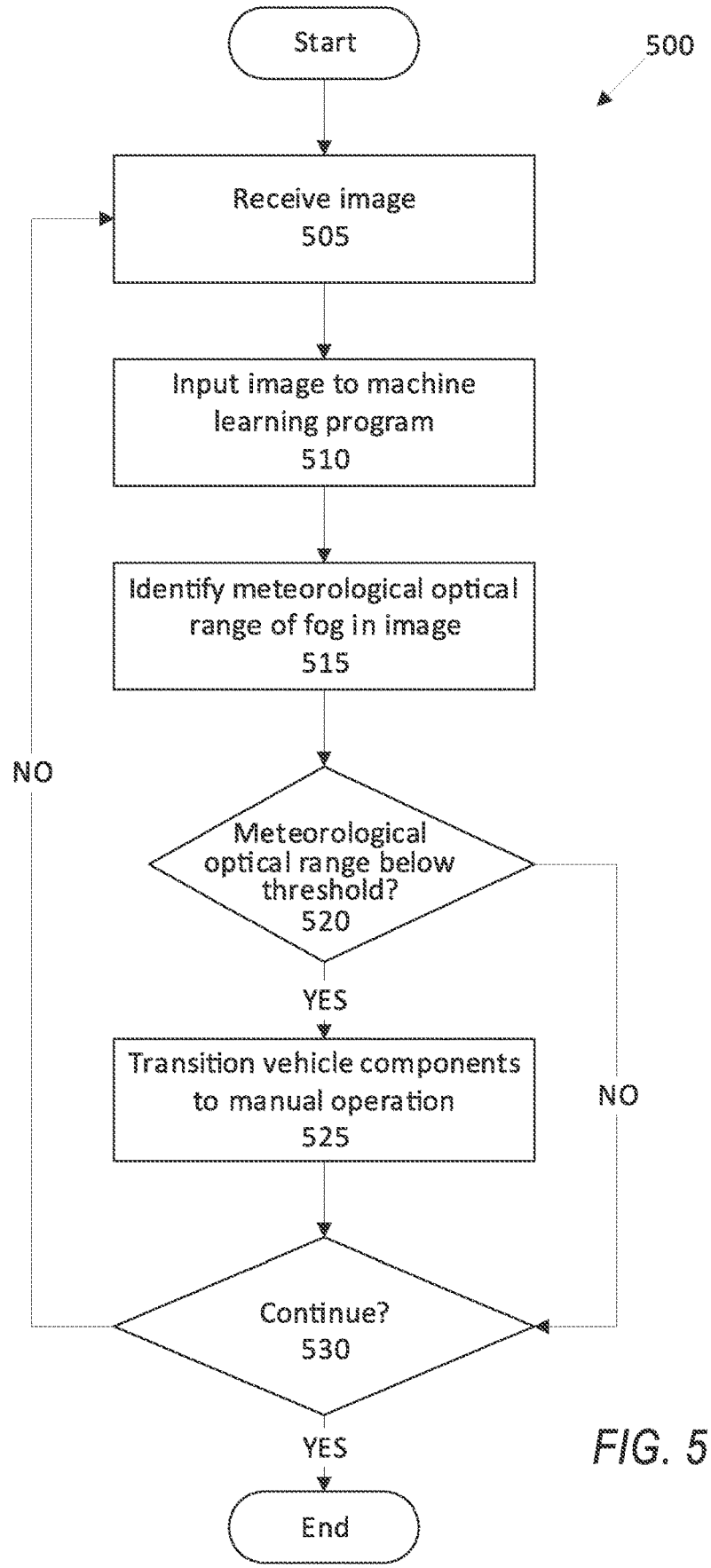
FIG. 5 is a diagram of an example process for operating the vehicle with a machine learning program.

FIG. 5 is a diagram of an example process 500 for operating a vehicle 101 according to a machine learning program 300 trained as described in FIG. 4. The process 500 begins in a block 505, in which a computer 105 of the vehicle 101 receives an image 200 from a camera 110. As described above, the computer 105 can actuate the camera 110 to collect an image 200 of a roadway in front of the vehicle 101. The image 200 can be, e.g., an RBG image 200.

Next, in a block 510, the computer 105 inputs the image 200 into the machine learning program 300. As described in FIG. 4, the machine learning program 300 can be a deep neural network 300 with a plurality of layers trained to output a meteorological optical range (MOR) r of fog in the image 200.

Next, in a block 515, the computer 105 identifies the MOR r of actual fog in the image 200. As described above, the machine learning program 300, trained on images 200 with simulated fog 205, outputs MOR r values for each pixel in the image 200. The computer 105 can identify a minimum MOR r in the image 200, that is, the smallest MOR r value output by the machine learning program 300.

Next, in a block 520, the computer 105 determines whether the minimum MOR r in the image 200 is below a threshold. The threshold can be a minimum distance for autonomous operation, i.e., have a minimum distance from the vehicle 101 from which data can be collected to operate a component 115 without manual input. For example, a brake can have a minimum distance of 60 meters because, upon actuating the brake, a distance to slow a vehicle 101 from a speed of 100 kilometers per hour to a stop is about 55 meters. Thus, the computer 105 can determine that, when the MOR r is less than 60 meters, the brake should be controlled by manual input. If the MOR r is below the threshold, the process 500 continues in a block 525. Otherwise, the process 500 continues in a block 530.

In the block 525, the computer 105 transitions one or more components 115 from autonomous operation to manual operation. As described above, the threshold is based on respective minimum distances to fog that the components 115 can operate. For example, if the MOR r is 45 meters, which is greater than a minimum distance of 30 meters for a steering 120 but less than a minimum distance of 60 meters for a brake 120, the computer 105 can transition the steering 120 to manual operation and maintain autonomous operation of the brake 120.

In the block 530, the computer 105 determines whether to continue the process 500. For example, the computer 105 can determine to continue the process 500 until arriving at a destination and powering down the vehicle 101. If the computer 105 determines to continue, the process 500 returns to the block 505 to collect another image 200. Otherwise, the process 500 ends.

Computing devices discussed herein, including the computer 105, include processors and memories, the memories generally each including instructions executable by one or more computing devices such as those identified above, and for carrying out blocks or steps of processes described above. Computer executable instructions may be compiled or interpreted from computer programs created using a variety of programming languages and/or technologies, including, without limitation, and either alone or in combination, Java™, C, C++, Visual Basic, Java Script, Python, Perl, HTML, etc. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in the computer 105 is generally a collection of data stored on a computer readable medium, such as a storage medium, a random access memory, etc.

A computer readable medium includes any medium that participates in providing data (e.g., instructions), which may be read by a computer. Such a medium may take many forms, including, but not limited to, non volatile media, volatile media, etc. Non volatile media include, for example, optical or magnetic disks and other persistent memory. Volatile media include dynamic random access memory (DRAM), which typically constitutes a main memory. Common forms of computer readable media include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. For example, in the process 400, one or more of the steps could be omitted, or the steps could be executed in a different order than shown in FIG. 4. In other words, the descriptions of systems and/or processes herein are provided for the purpose of illustrating certain embodiments and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

The article "a" modifying a noun should be understood as meaning one or more unless stated otherwise, or context requires otherwise. The phrase "based on" encompasses being partly or entirely based on.

What is claimed is:

1. A system, comprising:
   a computer including a processor and a memory, the memory storing instructions executable by the processor to:
   collect an image with a second vehicle sensor;
   input the image to a machine learning program trained by generating a synthetic image by adjusting respective color values of one or more pixels of a reference image based on a specified meteorological optical range from a first vehicle sensor to simulated fog, inputting the synthetic image to theft machine learning program to train the machine learning program to identify a meteorological optical range from the first vehicle sensor to actual fog;
   output, from the machine learning program, the meteorological optical range from the second vehicle sensor to the actual fog; and
   actuate one or more vehicle components based on the meteorological optical range from the vehicle sensor to the actual fog,
   wherein the instructions further include instructions to actuate a first component when the meteorological optical range from the second vehicle sensor to the actual fog is above a first threshold for the first component to operate without manual input, and to actuate a second component when the meteorological optical range from the second vehicle sensor to the actual fog is above a second threshold for the second component to operate without manual input.

2. The system of claim 1, wherein the instructions further include instructions to transition one of the one or more vehicle components from autonomous operation to manual operation when the meteorological optical range from the vehicle sensor to the actual fog is below a distance threshold.

3. The system of claim 2, wherein the instructions further include instructions to transition a vehicle from an autonomous mode to a manual mode when the meteorological optical range from the second vehicle sensor to the actual fog is below a second distance threshold.

4. The system of claim 1, wherein the instructions further include instructions to output, from the machine learning program, an object in the collected image and to actuate the one or more vehicle components based on the object output by the machine learning program.

5. The system of claim 1, wherein the instructions further include instructions to identify an ambient light of the reference image and to adjust the respective color values of the one or more pixels based on the ambient light.

6. The system of claim 1, wherein training the machine learning program includes annotating the synthetic image with the meteorological optical range from the sensor to the simulated fog.

7. The system of claim 1, wherein training the machine learning program includes adjusting the color values of one of the pixels in the reference image by decreasing the color values of the one of the pixels based on a transmission coefficient of light through fog and increasing an ambient light of the pixel based on the transmission coefficient.

8. The system of claim 1, wherein training the machine learning program includes identifying an initial distance from the first vehicle sensor to an object in one of the pixels of the reference image and adjusting the color values of the one of the pixels based on the initial distance and the specified meteorological optical range from the vehicle sensor to the simulated fog.

9. The system of claim 1, wherein the instructions further include instructions to identify an object with another second vehicle sensor and a distance from the other second vehicle sensor to the object, and to suppress actuation of one or more vehicle components based on the identified object when the distance from the other second vehicle sensor to the object exceeds the meteorological optical range from the second vehicle sensor to the actual fog.

10. The system of claim 1, wherein the meteorological optical range is a distance at which a luminosity of a beam of light extending from the vehicle sensor falls below a luminosity threshold.

11. A method, comprising:
generating a synthetic image by adjusting respective color values of one or more pixels of a reference image based on a specified meteorological optical range from a first vehicle sensor to simulated fog, the meteorological optical range being a distance at which a luminosity of a beam of light extending from the vehicle sensor falls below a luminosity threshold;
inputting the synthetic image to a machine learning program to train the machine learning program to identify a meteorological optical range from the first vehicle sensor to actual fog;
collecting an image with a second vehicle sensor;
inputting the image to the machine learning program;
outputting, from the machine learning program, the meteorological optical range from the vehicle sensor to the actual fog; and
actuating one or more second vehicle components based on the meteorological optical range from the vehicle sensor to the actual fog, including actuating a first component when the meteorological optical range from the vehicle sensor to the actual fog is above first threshold for the first component to operate without manual input, and to actuate a second component when the meteorological optical range from the second vehicle sensor to the actual fog is above a second threshold for the second component to operate without manual input.

12. The method of claim 11, further comprising transitioning one of the one or more second vehicle components from autonomous operation to manual operation when the meteorological optical range from the vehicle sensor to the actual fog is below a distance threshold.

13. The method of claim 11, further comprising outputting, from the machine learning program, an object in the collected image and actuating the one or more second vehicle components based on the object output by the machine learning program.

14. A system, comprising:
a vehicle sensor;
means for generating a synthetic image by adjusting respective color values of one or more pixels of a reference image based on a specified meteorological optical range from the vehicle sensor to simulated fog, the meteorological optical range being a distance at which a luminosity of a beam of light extending from the vehicle sensor falls below a luminosity threshold;
means for inputting the synthetic image to a machine learning program to train the machine learning program to identify a meteorological optical range from the vehicle sensor to actual fog;
means for collecting an image with the vehicle sensor;
means for inputting the image to the machine learning program;
means for outputting, from the machine learning program, the meteorological optical range from the vehicle sensor to the actual fog; and
means for actuating one or more vehicle components based on the meteorological optical range from the vehicle sensor to the actual fog, including actuating a first component when the meteorological optical range from the vehicle sensor to the actual fog is above a first threshold for the first component to operate without manual input, and to actuate a second component when the meteorological optical range from the second vehicle sensor to the actual fog is above a second threshold for the second component to operate without manual input.

15. The system of claim 14, further comprising means for transitioning one of the one or more vehicle components from autonomous operation to manual operation when the meteorological optical range from the vehicle sensor to the actual fog is below a distance threshold.

16. The system of claim 14, further comprising means for outputting, from the machine learning program, an object in the collected image and means for actuating the one or more vehicle components based on the object output by the machine learning program.

* * * * *

UNITED STATES PATENT AND TRADEMARK OFFICE
CERTIFICATE OF CORRECTION

PATENT NO. : 11,772,656 B2
APPLICATION NO. : 16/923367
DATED : October 3, 2023
INVENTOR(S) : Apurbaa Mallik et al.

Page 1 of 1

It is certified that error appears in the above-identified patent and that said Letters Patent is hereby corrected as shown below:

In the Claims

Claim 1, Column 12, Line 42: replace "image to theft machine" with "--image to the machine--"

Signed and Sealed this
Fourteenth Day of November, 2023

Katherine Kelly Vidal
*Director of the United States Patent and Trademark Office*